(12) United States Patent
Shimizu

(10) Patent No.: US 7,859,821 B2
(45) Date of Patent: Dec. 28, 2010

(54) MULTILAYER CERAMIC ELECTRONIC COMPONENT

(75) Inventor: Naoki Shimizu, Izumo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/784,553

(22) Filed: May 21, 2010

(65) Prior Publication Data

US 2010/0220426 A1   Sep. 2, 2010

Related U.S. Application Data

(63) Continuation of application No. PCT/JP2008/067205, filed on Sep. 24, 2008.

(30) Foreign Application Priority Data

Nov. 22, 2007   (JP)   ............................. 2007-303280

(51) Int. Cl.
*H01G 4/228* (2006.01)
*H01G 4/005* (2006.01)
*H01G 4/06* (2006.01)

(52) U.S. Cl. ...................... 361/306.3; 361/303; 361/311

(58) Field of Classification Search ................. 361/303, 361/311, 306.1, 306.3, 309
See application file for complete search history.

(56) References Cited

U.S. PATENT DOCUMENTS

| | | | | |
|---|---|---|---|---|
| 4,312,023 | A * | 1/1982 | Frappart et al. ............. | 361/243 |
| 5,657,199 | A * | 8/1997 | Devoe et al. ................ | 361/328 |
| 6,052,272 | A * | 4/2000 | Kuroda et al. .............. | 361/303 |
| 6,069,786 | A * | 5/2000 | Horie et al. ................. | 361/303 |
| 6,816,356 | B2 * | 11/2004 | Devoe et al. ................ | 361/309 |
| 6,970,341 | B1 * | 11/2005 | Devoe et al. ................ | 361/303 |
| 7,388,737 | B2 * | 6/2008 | Togashi et al. ............. | 361/306.3 |
| 7,394,643 | B2 * | 7/2008 | Yamane et al. ............. | 361/303 |
| 7,715,172 | B2 * | 5/2010 | Kawasaki et al. ........... | 361/303 |
| 2006/0039097 | A1 * | 2/2006 | Satou ........................ | 361/303 |

(Continued)

FOREIGN PATENT DOCUMENTS

JP         54-5755 U        1/1979

(Continued)

OTHER PUBLICATIONS

Official Communication issued in International Patent Application No. PCT/JP2008/067205, mailed on Dec. 16, 2008.

*Primary Examiner*—Eric Thomas
(74) *Attorney, Agent, or Firm*—Keating & Bennett, LLP

(57) ABSTRACT

A multilayer ceramic capacitor includes first internal electrodes extending to a first end surface of a ceramic element assembly, a plurality of second internal electrodes extending to a second end surface, floating internal electrodes arranged so as to overlap the first and second internal electrodes with ceramic layers disposed therebetween to define first and second effective regions, inner conductors that are elongated from the first end surface beyond a region that overlaps the first effective region in the direction of layering, and a relationship $X1<Y1<(L-E)$ is satisfied where L is the dimension in the longitudinal direction extending from the first end surface to the second end surface, X1 is the longitudinal-direction dimension of each of the first internal electrodes, Y1 is the distance between the first end surface and an end of each of the first internal electrodes, and E is the distance between the second end surface and an end of the second extended section.

15 Claims, 6 Drawing Sheets

U.S. PATENT DOCUMENTS

| | | |
|---|---|---|
| 2006/0187612 A1* | 8/2006 | Yamane et al. .............. 361/303 |
| 2007/0025054 A1* | 2/2007 | Tonogai et al. .............. 361/303 |
| 2008/0080121 A1* | 4/2008 | Togashi ...................... 361/303 |
| 2008/0084651 A1* | 4/2008 | Oguni et al. ................. 361/303 |

FOREIGN PATENT DOCUMENTS

| | | |
|---|---|---|
| JP | 3-206606 A | 9/1991 |
| JP | 5-47591 A | 2/1993 |
| JP | 6-163311 A | 6/1994 |
| JP | 2000-340448 A | 12/2000 |
| JP | 2001-358032 A | 12/2001 |
| JP | 2002-75780 A | 3/2002 |
| JP | 2007-123389 A | 5/2007 |

* cited by examiner

MULTILAYER CERAMIC ELECTRONIC COMPONENT

BACKGROUND OF THE INVENTION

1. Field of the Invention

The present invention relates to multilayer ceramic electronic components, for example, multilayer ceramic capacitors and multilayer ceramic thermistors, and in particular, to a multilayer ceramic electronic component including a floating internal electrode disposed in a ceramic element assembly and including a plurality of effective regions used to extract capacitance.

2. Description of the Related Art

Automobiles include various incorporated systems, including an engine, an air conditioner, and an air bag system. A plurality of control devices for controlling each of these systems, called electrical control units (ECUs), are incorporated, accordingly. Each ECU has various mounted electronic components. In recent years, with an increase in the number of systems, the number of ECUs incorporated in an automobile has increased. As such, miniaturization of an ECU and an electronic component mounted on the ECU is highly demanded. Thus, multilayer ceramic electronic components, such as multilayer ceramic capacitors, are widely used.

For a multilayer ceramic electronic component, externally applied stress, such as thermal stress due to a change in external temperature or flexural stress imposed on a mounting board, may cause a crack to occur in a ceramic element assembly. If the crack runs over the border between internal electrodes coupled to different potentials, a short-circuit may occur.

A structure to prevent such a short circuit is disclosed in Japanese Unexamined Patent Application Publication No. 6-163311 listed below. FIG. 10 is a front cross-sectional view that illustrates a multilayer ceramic capacitor described in Japanese Unexamined Patent Application Publication No. 6-163311. For a multilayer ceramic capacitor 101, a plurality of first internal electrodes 103 and a plurality of second internal electrodes 104 are arranged within a ceramic element assembly 102. The plurality of first internal electrodes 103 are extended to a first end surface 102a of the ceramic element assembly 102, and the plurality of second internal electrodes 104 are extended to a second end surface 102b of the ceramic element assembly 102. A first external terminal electrode 105 covering the first end surface 102a is arranged so as to be electrically coupled to the plurality of first internal electrodes 103. The first external terminal electrode 105 includes a terminal electrode main section 105a covering the end surface 102a and an extended section 105b continuous with the terminal electrode main section and extending to at least a first principal surface 102c and a second principal surface 102d of the ceramic element assembly 102. Similarly, a second external terminal electrode 106 is provided at the end surface 102b. The external terminal electrode 106 also includes a terminal electrode main section 106a and an extended section 106b.

The above-described crack caused by thermal stress or flexural stress typically occurs from edges of the extended sections 105b and 106b of the external terminal electrodes 105 and 106 toward the inside of the ceramic element assembly 102. For the multilayer ceramic capacitor 101, the length of a portion in which the first internal electrodes 103 and the second internal electrodes 104 overlap each other with ceramic layers disposed therebetween, that is, the opposing distance Z is smaller than the distance R between the extended sections 105b and 106b. As indicated by the arrow A illustrated in FIG. 10, even if a crack runs from an edge of the extended section 106b toward the inside of the ceramic element assembly 102, the crack is merely located over the second internal electrodes 104 coupled to one potential, so that no short-circuit occurs.

However, an actual crack does not always run from an edge of the extended section 106b in the direction of layering, as indicated by the arrow A. For example, as indicated by the arrow B, a crack may run obliquely from the edge of the extended section 106b and extend to an effective region in which the first and second internal electrodes 103 and 104 are opposed to each other. In that case, a short-circuit disadvantageously occurs.

Japanese Unexamined Utility Model Registration Application Publication No. 54-5755 discloses a multilayer ceramic capacitor including a floating internal electrode and having first and second effective regions arranged within a ceramic element assembly. FIG. 11 is a front cross-sectional view that illustrates the multilayer ceramic capacitor described in Japanese Unexamined Utility Model Registration Application Publication No. 54-5755.

For a multilayer ceramic capacitor 111, a plurality of first internal electrodes 113 extending to a first end surface 112a of a ceramic element assembly 112 are provided within the ceramic element assembly 112. A plurality of second internal electrodes 114 are provided at the same height positions as the plurality of first internal electrodes 113 so as to be extended to a second end surface 112b. First and second terminal electrodes 115 and 116 are formed at the end surfaces 112a and 112b, respectively. The terminal electrodes 115 and 116 include terminal electrode main sections 115a and 116a, respectively, and extended sections 115b and 116b, respectively.

A plurality of floating internal electrodes 117 is arranged within the ceramic element assembly 112. The floating internal electrodes 117 are opposed to the first internal electrodes 113 and the second internal electrodes 114 with ceramic layers disposed therebetween.

Accordingly, in a portion where the plurality of first internal electrodes 113 and the plurality of floating internal electrodes 117 overlap each other with ceramic layers disposed therebetween, a first effective region for extracting capacitance is provided. Similarly, in a portion where the plurality of floating internal electrodes 117 and the plurality of second internal electrodes 114 overlap each other with ceramic layers disposed therebetween, a second effective region for extracting capacitance is provided.

For the multilayer ceramic capacitor 111 described in Japanese Unexamined Utility Model Registration Application Publication No. 54-5755, a first effective region 118 and a second effective region 119 are provided. Accordingly, as indicated by the arrow C1 illustrated in FIG. 11, even if a crack occurs and runs obliquely from an edge of the extended section 115b of the first external terminal electrode 115, a short-circuit is prevented in the second effective region 119.

At the opposite second external terminal electrode 116 side, even if a crack C2 occurs and runs obliquely from an edge of the extended section 116b, as indicated by the arrow C2, and reaches the second effective region, a short-circuit is prevented in the first effective region 118.

Accordingly, in the case of the multilayer ceramic capacitor 101 illustrated in FIG. 10, a short-circuit occurs if an obliquely running crack B occurs. In contrast, for the multilayer ceramic capacitor 111, even if the obliquely running crack C1 or C2 occurs, no short circuit occurs.

However, the cracks C1 and C2 may appear at the same time. In that case, a short circuit disadvantageously occurs.

SUMMARY OF THE INVENTION

To overcome the problems described above, preferred embodiments of the present invention provide a multilayer ceramic electronic component capable of more reliably preventing a crack from causing a short circuit, even if the crack runs from an extended section of an external terminal electrode toward the inside of a ceramic element assembly.

A multilayer ceramic electronic component according to a first preferred embodiment of the present application includes a ceramic element assembly in which a plurality of ceramic layers are layered, the ceramic element assembly including opposed first and second principal surfaces and opposed first and second end surfaces, a direction of layering thereof being a direction that links the first and second principal surfaces, a first external terminal electrode including a first terminal electrode main section provided on the first end surface and a first extended section continuous with the first terminal electrode main section and extending to the first and second principal surfaces, a second external terminal electrode including a second terminal electrode main section provided on the second end surface and a second extended section continuous with the second terminal electrode main section and extending to the first principal surface and the second principal surface, a first internal electrode disposed within the ceramic element assembly and extending to the first end surface so as to be electrically coupled to the first external terminal electrode, a second internal electrode disposed within the ceramic element assembly, being coplanar or substantially coplanar with the first internal electrode, and extending to the second end surface so as to be electrically coupled to the second external terminal electrode, and a floating internal electrode disposed within the ceramic element assembly so as not to extend to either the first end surface or the second end surface, and opposed to the first internal electrode and the second internal electrode with a specified one of the ceramic layers disposed therebetween.

In the multilayer ceramic electronic component, a portion in which the first internal electrode and the floating internal electrode are opposed to each other defines a first effective region, and a second effective region is defined in a portion where the second internal electrode and the floating internal electrode are opposed to each other.

The multilayer ceramic electronic component preferably further includes a first inner conductor disposed within the ceramic element assembly and elongated in parallel or substantially in parallel with the first and second principal surfaces so as to overlap at least the first effective region in the direction of layering between the first effective region and at least one of the first and second principal surfaces, and a relationship $X1<Y1<(L-E)$ is satisfied where L is a dimension of the ceramic element assembly in a longitudinal direction that links the first end surface and the second end surface, X1 is a length dimension of the first internal electrode along the longitudinal direction along the length dimension L, Y1 is a distance between the first end surface and an end of the first inner conductor that is adjacent to the second end surface, and E is a distance from the second end surface to an end of the second extended section, and within the ceramic element assembly, the first inner conductor is not flush with any other inner conductors.

A second preferred embodiment of the present application is a multilayer ceramic electronic component that includes a ceramic element assembly in which a plurality of ceramic layers are layered, the ceramic element assembly including opposed first and second principal surfaces and opposed first and second end surfaces, a direction of layering thereof being a direction that links the first and second principal surfaces, a first external terminal electrode including a first terminal electrode main section provided on the first end surface and a first extended section continuous with the first terminal electrode main section and extending to the first and second principal surfaces, a second external terminal electrode including a second terminal electrode main section provided on the second end surface and a second extended section continuous with the second terminal electrode main section and extending to the first principal surface and the second principal surface, a first internal electrode disposed within the ceramic element assembly and extending to the first end surface so as to be electrically coupled to the first external terminal electrode, a second internal electrode disposed within the ceramic element assembly, being coplanar or substantially coplanar with the first internal electrode, and extending to the second end surface so as to be electrically coupled to the second external terminal electrode, and a floating internal electrode disposed within the ceramic element assembly so as not to extend to either the first end surface or the second end surface, and opposed to the first internal electrode and the second internal electrode with a specified ceramic one of the ceramic layers disposed therebetween.

In the multilayer ceramic electronic component according to the second preferred embodiment of the present invention, a portion in which the first internal electrode and the floating internal electrode are opposed to each other defines a first effective region, and a second effective region is defined in a portion where the second internal electrode and the floating internal electrode are opposed to each other. The multilayer ceramic electronic component according to the present preferred embodiment preferably further includes a first inner conductor disposed within the ceramic element assembly and elongated in parallel or substantially in parallel with the first and second principal surfaces so as to overlap at least the first effective region in the direction of layering between the first effective region and at least one of the first and second principal surfaces and a second inner conductor disposed within the ceramic element assembly and arranged coplanar or substantially coplanar with the first inner conductor so as to be electrically isolated from the first inner conductor. Relationships $Y1>Y2$, $X1<Y1<(L-E)$, and $Y2<X2$ are satisfied where L is a dimension of the ceramic element assembly in a longitudinal direction that links the first end surface and the second end surface, X1 is a length dimension of the first internal electrode along the longitudinal direction, X2 is a length dimension of the second internal electrode along the longitudinal direction, Y1 is a distance between the first end surface and an end of the first inner conductor that is adjacent to the second end surface, Y2 is a distance between the second end surface and an end of the second inner conductor that is adjacent to the first end surface, and E is a distance from the second end surface to an end of the second extended section.

For the multilayer ceramic electronic component according to the second preferred embodiment, $G1=G2=(L-X3)$ may preferably be satisfied where G1 is a distance between the first and second internal electrodes, G2 is a distance between the first and second inner conductors, and X3 is a length dimension of the floating internal electrode along the longitudinal direction. In this case, the multilayer ceramic electronic component according to the second preferred embodiment is easily obtained by layering a plurality of ceramic green sheets each having a single conductive pattern.

For the multilayer ceramic electronic component according to preferred embodiments of the present invention, the relationship $Y1 \geq L/2$ may preferably be satisfied. This can cause a crack at an edge of the second extended section at the second end surface side to occur preferentially and can more reliably prevent the occurrence of a crack running from an edge of the first extended section of the first external terminal electrode.

Preferably, the relationship $Y1 \leq (L-X2)$ may be satisfied. In that case, a crack can more preferentially appear from the edge of the second extended section of the second external terminal electrode.

For the multilayer ceramic electronic component according to preferred embodiments of the present invention, the relationships $F1<E0$ and $F2<E$ may preferably be satisfied where F1 is a distance between the first end surface and the first effective region, F2 is a distance between the second end surface and the second effective region, and E0 is a distance between the first end surface and an edge of the first extended section. In this case, the first and second extended sections of the first and second external terminal electrodes do not overlap the first and second effective regions in the direction of layering of the ceramic element assembly. Accordingly, even if a crack runs from an edge of the first or second extended section in the direction of layering, the crack do not cause a short-circuit.

For the multilayer ceramic electronic component according to preferred embodiments of the present invention, the floating internal electrode may preferably be located outermost in the direction of layering in the first and second effective regions. This can preferably produce capacitance between the floating internal electrode and the first inner conductor or each of the first and second inner conductors, and thus capacitance can be adjusted during the designing stage. In this case, within the ceramic element assembly, the first inner conductor may be arranged at one side in the direction of layering in the first effective region, or alternatively, the first inner conductor may be arranged at each of both sides in the direction of layering in the first effective region.

With the multilayer ceramic electronic component according to the first preferred embodiment, because the relationship $X1<Y1<(L-E)$ is satisfied, the inner stress occurring within the ceramic element assembly when external stress, such as thermal stress, is applied in the first effective region and that in the second effective region are unbalanced. That is, in the second end surface side, at which no first inner conductor is provided, tensile stress caused by contraction of the first inner conductor during sintering remains. Thus, when external stress is applied, a crack more frequently occurs from the edge of the second extended section than from the edge of the first extended section.

Accordingly, with the first preferred embodiment, because a crack preferentially occurs from the edge of the second extended section and less frequently occurs from the edge of the first extended section, a short circuit can be reliably prevented in the first effective region.

With the multilayer ceramic electronic component according to the second preferred embodiment, because the relationships $Y1>Y2$, $X1<Y1<(L-E)$, and $Y2<X2$ are satisfied, internal stress resulting from external stress at the second end surface side is greater than that at the first end surface side. Thus, if a crack occurs, it preferentially appears from the edge of the second extended section, not from the edge of the first extended section, so a short-circuit in the first effective region can be reliably prevented.

These and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

Figure 1:
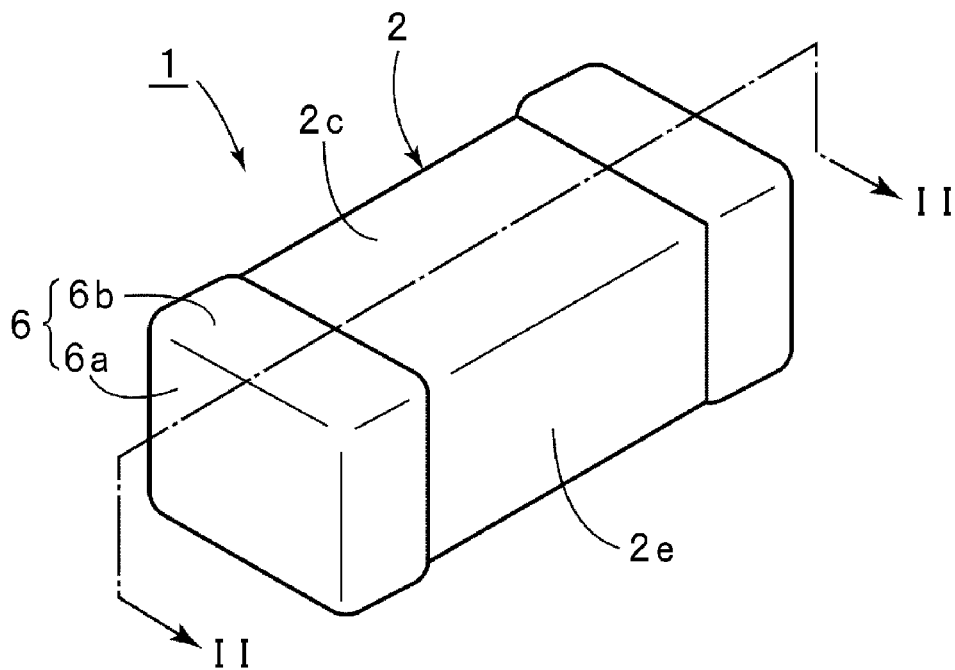
FIG. 1 is a perspective view that illustrates an exterior appearance of a multilayer ceramic capacitor according to a first preferred embodiment of the present invention.
Figure 2:
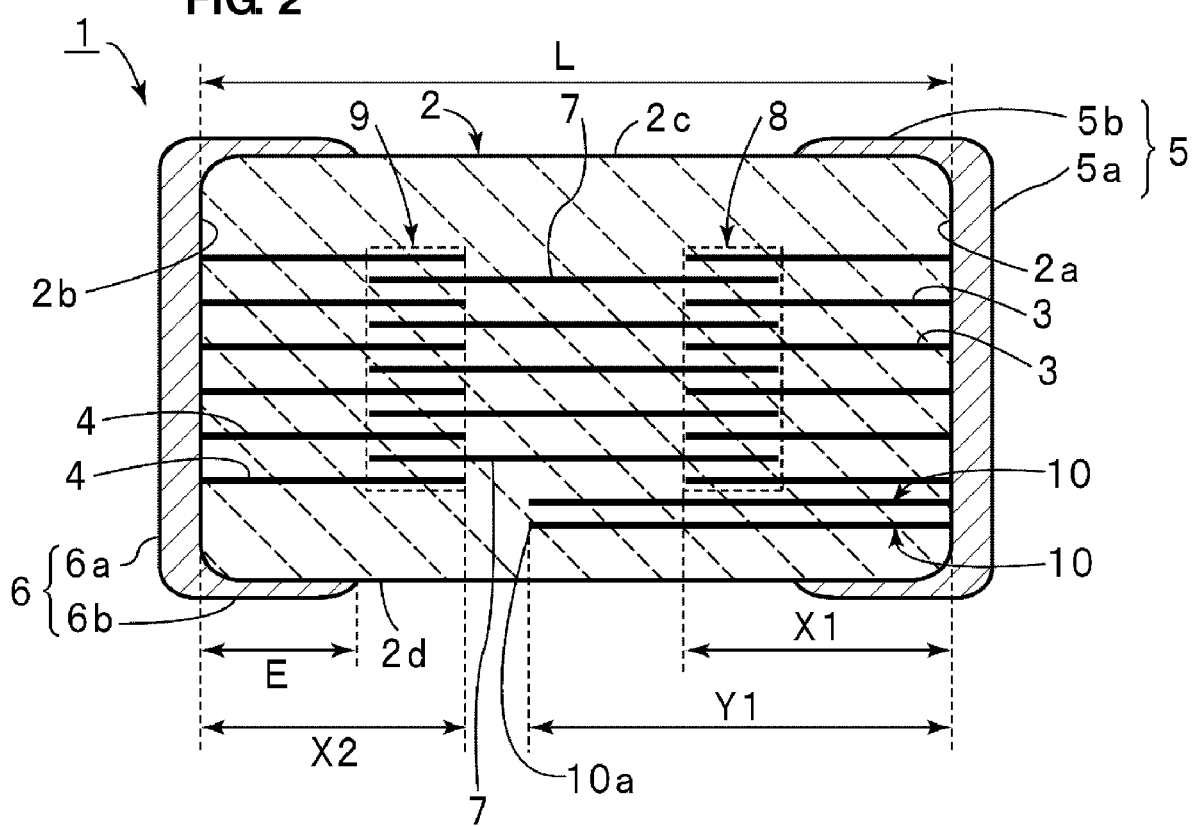
FIG. 2 is a front cross-sectional view of the multilayer ceramic capacitor according to the first preferred embodiment of the present invention and is a cross-sectional view taken along the line II-II illustrated in FIG. 1.

FIG. 1 is a perspective view that illustrates an external appearance of a multilayer ceramic capacitor as a multilayer ceramic electronic component according to a first preferred embodiment of the present invention. FIG. 2 is a cross-sectional view taken along the line II-II of FIG. 1. A multilayer ceramic capacitor 1 includes a ceramic element assembly 2. The ceramic element assembly 2 is made of a ceramic sinter fired by ceramic integral sintering together with first and second internal electrodes described below.

The ceramic element assembly 2 preferably has a substantially rectangular parallelepiped shape, for example. The ceramic element assembly 2 has opposed first and second end surfaces 2a and 2b and opposed first and second principal surfaces 2c and 2d. The ceramic element assembly 2 also has a side surface 2e illustrated in FIG. 1 and an opposite side surface opposed to the side surface 2e. The direction of layering is a direction that links the first and second principal surfaces 2c and 2d. This is because the ceramic element assembly 2 is obtained by firing a ceramic multilayer structure acquired by layering a plurality of ceramic green sheets each having an inner conductive pattern provided thereon by a manufacturing process described below, and thus the direction of layering is the direction linking the first and second principal surfaces 2c and 2d.

A plurality of first internal electrodes 3 are disposed within the ceramic element assembly 2. The plurality of first internal electrodes 3 extend to the first end surface 2a. A plurality of second internal electrodes 4 are arranged at the same height location as the plurality of first internal electrodes 3. The plurality of second internal electrodes 4 extend to the second end surface 2b. Edges of the plurality of first internal electrodes 3 and edges of the plurality of second internal electrodes 4 are opposed to each other with gaps disposed therebetween in a central portion in the longitudinal direction linking the end surfaces 2a and 2b of the ceramic element assembly 2.

A first external terminal electrode 5 is arranged so as to cover the first end surface 2a of the ceramic element assembly 2. The first external terminal electrode 5 includes a first terminal electrode main section 5a covering the first end surface 2a and a first extended section 5b continuous with the first terminal electrode main section 5a and extending to the first and second principal surfaces 2c and 2d. Similarly, a second external terminal electrode 6 is arranged so as to cover the second end surface 2b. The second external terminal electrode 6 includes a second terminal electrode main section 6a formed on the second end surface 2b and a second extended section 6b continuous with the terminal electrode main section 6a and extending to the first and second principal surfaces 2c and 2d.

For the present preferred embodiment, each of the first terminal electrode main section 5a and the second terminal electrode main section 6a preferably extends not only on the first and second principal surfaces 2c and 2d but also on the side surface 2e and the opposite side surface. However, alternatively, the extended section may not extend to the side surface 2e and its opposite side surface.

A plurality of floating internal electrodes 7 are provided within the ceramic element assembly 2. The floating internal electrodes 7 are opposed to the first internal electrodes 3 and the second internal electrodes 4. That is, as illustrated in FIG. 2, a first effective region 8 defining a first capacitance extraction portion is provided in a portion in which the plurality of first internal electrodes 3 and the plurality of floating internal electrodes 7 are layered with ceramic layers disposed therebetween. Similarly, a portion in which the plurality of second internal electrodes 4 and the plurality of floating internal electrodes 7 are layered with ceramic layers disposed therebetween defines a second effective region 9 defining a second capacitance extraction portion. Accordingly, for the present preferred embodiment, a series connection multilayer capacitor in which a first effective region and a second effective region are connected in series is provided.

The floating internal electrodes 7 do not extend to the first end surface 2a or the second end surface 2b.

For the multilayer ceramic capacitor 1 according to the present preferred embodiment, a plurality of inner conductors 10 are disposed below a portion in which the above second effective region 9 is disposed. The plurality of inner conductors 10 extend to the second end surface 2b, and their edges are located between the first and second effective regions 8 and 9.

The plurality of inner conductors 10 extend from the first end surface 2a and pass below the first effective region, and their edges extend to a gap between the first and second effective regions 8 and 9, as described above.

For the present preferred embodiment, the first inner conductors 10 extend to the first end surface 2a. However, they may not extend to the first end surface 2a. In other words, the first inner conductors 10 are disposed so as to extend in parallel or substantially in parallel with the first and second principal surfaces 2c and 2d and so as to include at least a portion that overlaps the first effective region 8 in the direction of layering. It is not necessary to provide the plurality of inner conductors 10, and instead, a single first inner conductor 10 may be provided. Alternatively, the first inner conductors 10 may include three or more layers.

Preferably, the first effective region 8 and the second effective region 9 are arranged symmetrically or substantially symmetrically with respect to an imaginary center line passing through the center of the ceramic element assembly and extending along the above direction of layering. This enables the residual stress in the first effective region 8 and that in the second effective region 9 to be substantially equal to each other and ensures an internal-stress balance obtained by arranging the first inner conductors 10 as described below.

For the multilayer ceramic capacitor 1 according to the present preferred embodiment, a relationship $X1<Y1<(L-E)$ is preferably satisfied where the dimension of the ceramic element assembly in the longitudinal direction connecting the first end surface 2a and the second end surface 2b is L, the longitudinal dimension of the first internal electrode along that longitudinal direction is X1, the distance between the first end surface 2a and an end 10a of the first inner conductor adjacent to the second end surface is Y1, and the distance from the second end surface 2b to the end of the second extended section 6b is E, and the first inner conductor 10 is not coplanar or substantially coplanar with any other inner conductors.

Figure 3:
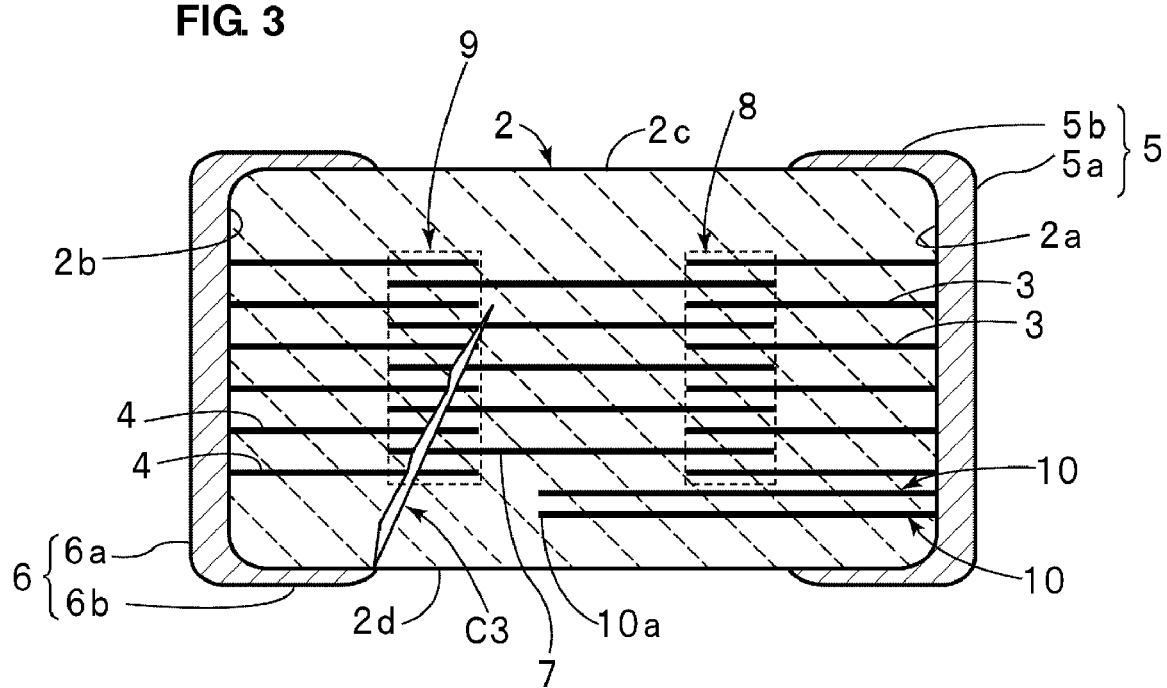
FIG. 3 is a front cross-sectional view for use in describing how a crack appears in the multilayer ceramic capacitor of the first preferred embodiment of the present invention.

Accordingly, even if a crack occurs due to external thermal stress or flexural stress, the crack runs from the end of the second extended section 6b toward the inside of the ceramic element assembly 2 and no crack occurs from the end of the first extended section 5b. Thus, even if a crack occurs as indicated by the arrow C3 illustrated in FIG. 3, no crack occurs in the first effective region 8, so that a short-circuit can be reliably prevented.

That is, one of the unique features of the present preferred embodiment is that, while the occurrence of a crack is accepted, a crack can occur only in the second effective region 9 of the first and second effective regions 8 and 9 and a crack is prevented from extending into the first effective region 8, thus avoiding a short-circuit.

This is because the first inner conductors 10 are arranged adjacent to the first end surface 2a within the ceramic element assembly 2 and thus the residual stress at the first end surface 2a side and that at the second end surface 2b side of the ceramic element assembly 2 are unbalanced in a sintering step for obtaining the ceramic element assembly 2. That is, contraction of the first inner conductor 10 draws the ceramic element assembly at the second end surface 2b side, and the residual stress caused by the drawing remains in the second end surface 2b side of the ceramic element assembly 2. Thus, if an external stress is applied to the finally obtained multilayer ceramic capacitor 1, a crack runs from the end of the second extended section 6b toward the inside of the ceramic element assembly 2. Accordingly, the occurrence of a crack in the first effective region 8 can be reliably prevented, and a short-circuit can be reliably prevented accordingly.

The first inner conductor 10 is provided in at least a location in which it overlaps the first effective region 8 in the direction of layering. Thus, even if a crack runs from the end of the second extended section 6b toward the first inner conductor 10, the presence of the first inner conductor 10 suppresses propagation of the crack. This also prevents a crack from entering the first effective region 8.

If the end 10a of the first inner conductor 10 is too close to the second end surface 2b, a crack may cause a short-circuit between the first inner conductor 10 and the second internal electrode 4. Thus, as described above, the relationship $Y1<$ (L–E) is preferably satisfied, and this can prevent a short-circuit defect between the first inner conductor 10 and the second internal electrode 4.

For the present preferred embodiment, the presence of the first inner conductor 10 physically reinforces the portion of the ceramic element assembly 2 at the first end surface 2a side. In contrast, the strength of the portion of the second end surface 2b is relatively low. Such unbalanced strength also facilitates a crack to occur from the end of the second extended section 6b.

To increase the unbalance between the first end surface 2a side and the second end surface 2b side of the ceramic element assembly 2, preferably, the relationship $Y1 \geq L/2$ is satisfied. That is, the end 10a of the first inner conductor 10 may preferably be arranged in the center between the first and second end surfaces 2a and 2b or arranged between the center and the second end surface 2b. This promotes a crack to occur from the end of the second extended section 6b.

Additionally, to reliably prevent a short-circuit, when the length dimension of the second internal electrode 4 in the above longitudinal direction is X2, a relationship $1 \leq (L-X2)$ is preferably satisfied. That is, positioning the end 10a of the first inner conductor 10 at the edge of the second internal electrode 4 or between the edge and the first end surface 2a can reinforce the ceramic element assembly at the first end surface 2a side more effectively and can more reliably prevent propagation of a crack toward the first effective region 8. This more effectively prevents a short-circuit from occurring.

A crack may result from an electric field that is concentrated on the edges of the first and second extended sections 5b and 6b of the external terminal electrodes 5 and 6. Thus, the multilayer ceramic capacitor 1 may preferably be mounted on a mounting board such that the second external terminal electrode 6, at which induction of a crack is preferable, is connected at an input side. In this case, it is necessary to consider the orientation of the multilayer ceramic capacitor 1 during mounting. Accordingly, which side the second end surface 2b is located at may preferably be indicated on an external surface of the multilayer ceramic capacitor 1 by, for example, a marking. The marking can be provided by any appropriate technique, such as printing using paint or laser marking, for example.

For the multilayer ceramic capacitor 1 according to the present preferred embodiment, any appropriate dielectric ceramic can be used as a material forming the ceramic element assembly 2. Examples of such dielectric ceramic include dielectric ceramic including $BaTiO_3$, $CaTiO_3$, $SrTiO_3$, or $CaZrO_3$ as the main ingredient. Dielectric ceramic in which an accessory ingredient, such as a Mn compound, an Fe compound, a Cr compound, a Co compound, or a Ni compound, is added to the main ingredient may also be used.

The external terminal electrodes 5 and 6 can be made of any appropriate conductive material. For example, a conductive material, such as Cu, Ni, Ag, Pd, Au, or an Ag—Pd alloy, can be used. The external terminal electrodes 5 and 6 may also have a multilayer structure of a plurality of electrode layers. When nickel is used as the material of the internal electrodes 3 and 4, to enhance coupling between the internal electrodes and the external terminal electrodes 5 and 6, a layer of each of the external terminal electrodes 5 and 6 that is directly connected to the internal electrodes 3 and 4 may preferably be made of base metal, such as Cu or Ni, for example.

The external terminal electrodes 5 and 6 may also be formed by being fired simultaneously with the internal electrodes 3 and 4 and the ceramic element assembly 2. The external terminal electrodes 5 and 6 may also be formed by applying and baking conductive paste, plating, or other technique after the ceramic element assembly 2 is obtained.

The thickness of each of the external terminal electrodes 5 and 6 may preferably be in the range of about 20 μm to about 100 μm in the thickest portion, for example.

With the aim of enhancing soldering or other aims, the external surface of each of the external terminal electrodes 5 and 6 may preferably be coated with any appropriate plating film. A material forming such plating film is not particularly limited, and examples thereof include Cu, Ni, Ag, Pd, a Ag—Pd alloy, and Au. The thickness of the plating film per layer may preferably be in the range of about 1 μm to about 10 μm, for example.

Additionally, a resin layer for use in stress reduction may be inserted between the external terminal electrodes 5 and 6 and the plating film formed on the external surface.

Each of the first and second internal electrodes 3 and 4, floating internal electrodes 7, and first inner conductors 10 can be made of any appropriate conductive material. Also as such a material, a metal or alloy similar to the metal forming the above-described external terminal electrodes 5 and 6 can also be used. The thickness of each of the internal electrodes 3 and 4, floating internal electrode 7, and first inner conductor 10 after firing may preferably be in the range of about 0.5 μm to about 2.0 μm, for example. The first and second internal electrodes 3 and 4, floating internal electrode 7, and inner conductor 10 may also be made of different metals or the same metal. Preferably, the use of the same material can simplify the manufacturing process.

An example method of manufacturing the multilayer ceramic capacitor 1 is described. Ceramic green sheets are obtained by using ceramic slurry of a mixture of dielectric ceramic powder to obtain the ceramic element assembly 2, binder resin, and solvent. To form the first and second internal electrodes 3 and 4, the floating internal electrode 7 or the first inner conductor 10, conductive paste is applied on the ceramic green sheets by screen printing or other suitable method to form an inner conductive pattern. A specific number of ceramic green sheets each having the inner conductive pattern are layered, a specific number of plain ceramic green sheets are layered on the top and bottom, and a mother multilayer structure is obtained. After the mother multilayer structure is pressed in the thickness direction, it is cut into multilayer structures of individual multilayer ceramic capacitors. The multilayer structure of each of the obtained individual multilayer ceramic capacitors is fired, and the ceramic element assembly 2 is obtained. After the ceramic element assembly 2 is obtained, conductive paste for forming the external terminal electrodes 5 and 6 is applied and baked, and then the external terminal electrodes 5 and 6 are formed.

As described above, the external terminal electrodes 5 and 6 may also be formed by the application of conductive paste on the multilayer structure and firing simultaneously with the internal electrodes 3 and 4.

Figure 4:
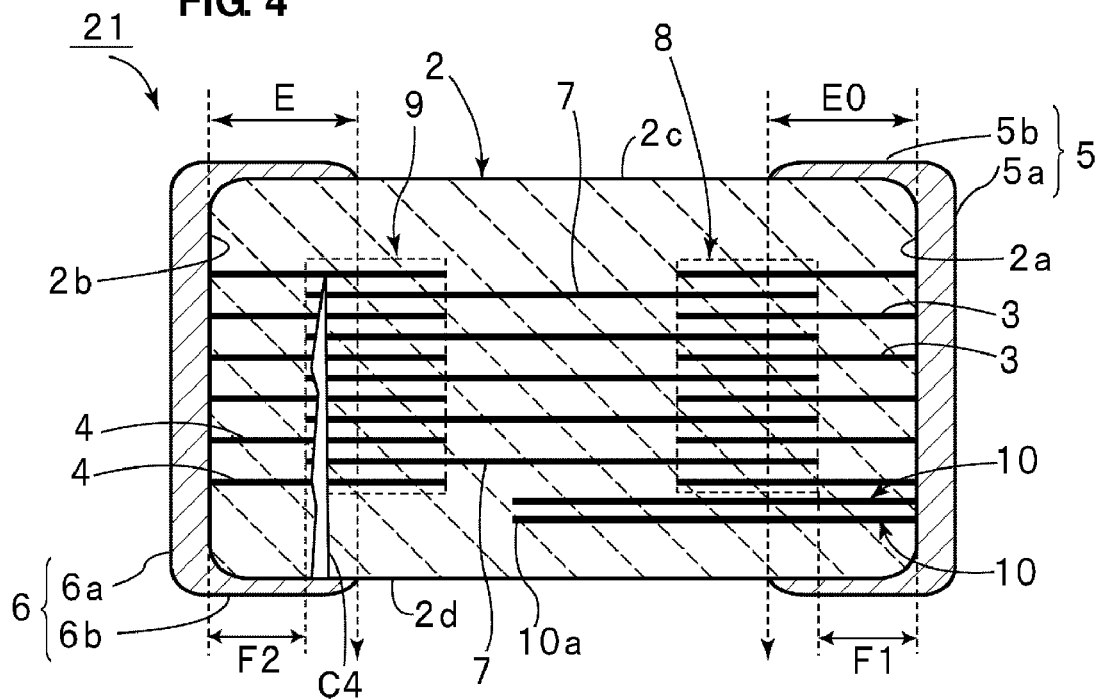
FIG. 4 is a front cross-sectional view of a multilayer ceramic capacitor according to a modification of the first preferred embodiment of the present invention.

FIG. 4 is a front cross-sectional view that illustrates a multilayer ceramic capacitor 21 according to a modification of the multilayer ceramic capacitor 1 in the first preferred embodiment. The multilayer ceramic capacitor 21 is similar to the first preferred embodiment, except that the first and second effective regions 8 and 9 overlap the edges of the first and second extended sections 5b and 6b, respectively, in the above-described direction of layering in the ceramic element assembly 2.

That is, in the multilayer ceramic capacitor 1, the first extended section 5b and the first effective region 8 do not overlap each other in the direction of layering, and the second extended section 6b and the second effective region 9 do not overlap each other in the direction of layering. In contrast, in the present modification, between the first effective region and at least one of the first principal surface 2c and the second principal surface 2d, the relationships E0>F1 and E>F2 are preferably satisfied where the distance between the first end surface 2a and the end of the first extended section 5b is E0, the distance between the second principal surface 2d and the end of the second extended section 6b is E, the distance between the first end surface 2a and the first effective region 8 is F1, and the distance between the second end surface 2b and the second effective region 9 is F2. The first extended section 5b and the first effective region 8 overlap each other, and the second extended section 6b and the second effective region 9 overlap each other.

In the first preferred embodiment, a crack preferably occurs from the second extended section 6b side, as compared to from the first extended section 5b. If the direction in which that crack runs is the direction of layering, the crack may run through a portion between the second effective region 9 and the second end surface 2b, that is, a portion in which only the second internal electrodes 4 are layered with ceramic layers disposed therebetween without entering the second effective region 9. In this case, a short circuit is prevented at the first effective region 8 side, whereas a portion or all of the electrical routes from the second external terminal electrode 6 are disconnected. This may result in a malfunction of a portion or all of the first effective region 8, and capacitance may be significantly reduced.

In contrast, in the present modification, if a crack propagates in the direction indicated by the arrow C4 from the second extended section 6b, for example, a short-circuit defect occurs in the second effective region 9. As a result, an electrical route that electrically connects the second external terminal electrode 6 and floating internal electrode 7 with the crack disposed therebetween remains. Accordingly, the first effective region 8 can function normally. Accordingly, in the present modification, not only a short-circuit can be reliably prevented, but also a portion or all of the capacitance depending on the first effective region 8 can be reliably produced.

With the present modification, each of the first and second effective regions 8 and 9 can have a relatively large size, so that capacity can be increased.

Figure 5:
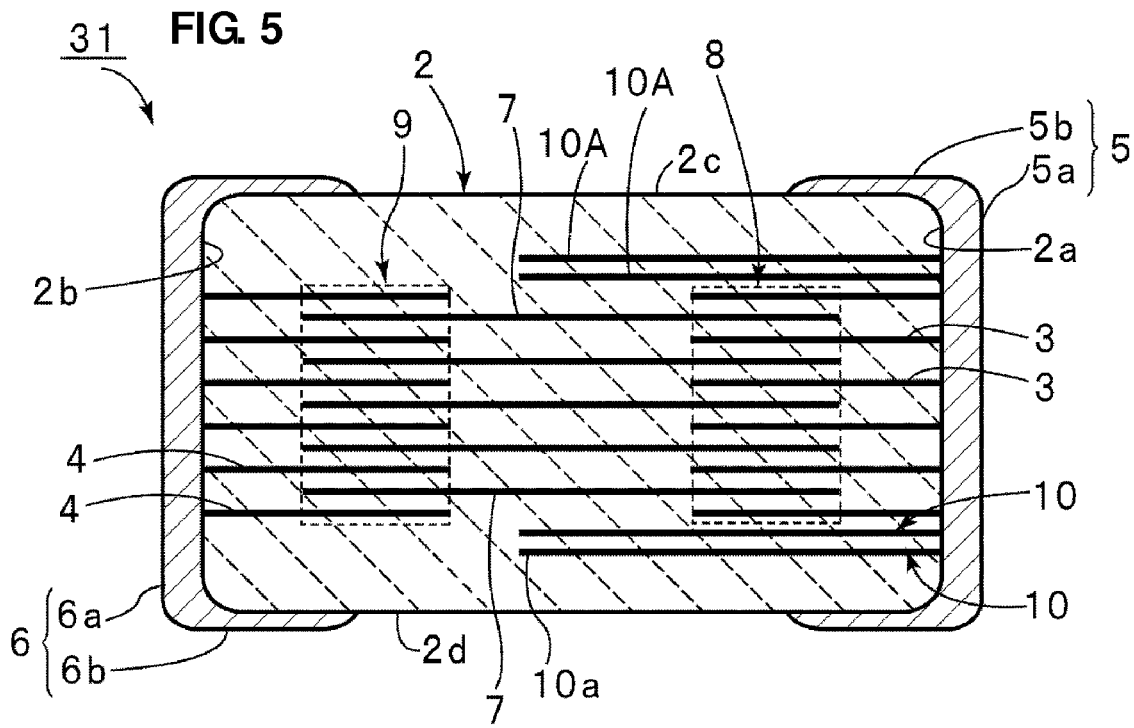
FIG. 5 is a front cross-sectional view of a multilayer ceramic capacitor according to another modification of the first preferred embodiment of the present invention.

FIG. 5 is a front cross-sectional view that illustrates a multilayer ceramic capacitor according to another modification of the multilayer ceramic capacitor in the first preferred embodiment. For a multilayer ceramic capacitor 31 illustrated in FIG. 5, the first and second effective regions 8 and 9 are substantially the same as those in the multilayer ceramic capacitor 21 illustrated in FIG. 4. Additionally, the multilayer ceramic capacitor 31 also includes a plurality of first inner conductors 10A formed above the first effective region 8, in addition to the plurality of first inner conductors 10. This eliminates the necessity to identify the orientation in the direction of layering. In such a manner, the plurality of first inner conductors may be arranged at both sides of a portion in which the first or second internal electrodes 3 or 4 overlap the floating internal electrodes in the direction of layering, or alternatively, as in the above-described preferred embodiment and the multilayer ceramic capacitor 21 illustrated in FIG. 4, the plurality of inner conductors may be arranged at only one side in the direction of layering.

Figure 6:
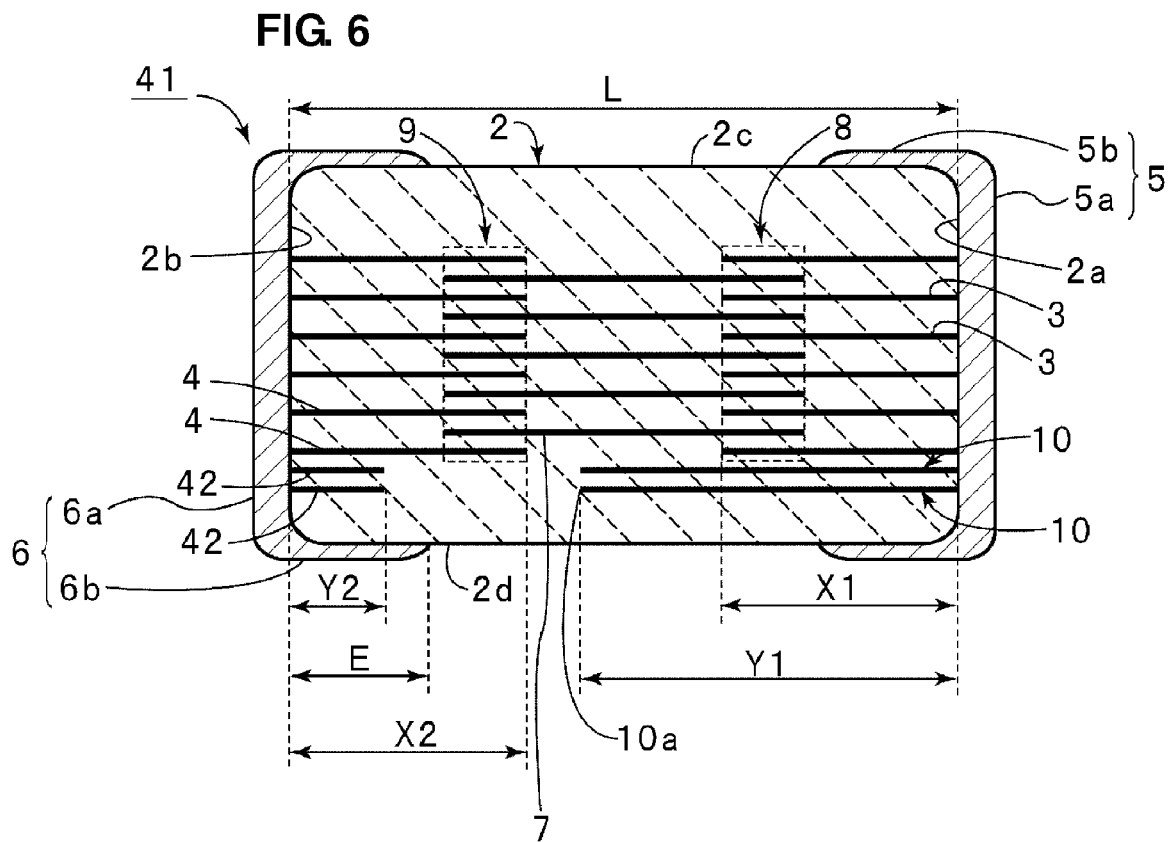
FIG. 6 is a front cross-sectional view of a multilayer ceramic capacitor according to a second preferred embodiment of the present invention.

FIG. 6 is a front cross-sectional view of a multilayer ceramic capacitor according to a second preferred embodiment of the present invention. A multilayer ceramic capacitor 41 according to the present preferred embodiment preferably is substantially the same as the multilayer ceramic capacitor 1 in the first preferred embodiment, except that second inner conductors 42 electrically isolated from the first inner conductors 10 are arranged at the same height location as the first inner conductors 10. The second inner conductors 42 extend to the second end surface 2b. Although, the second inner conductors 42 may not extend to the second end surface 2b.

Relationships Y1>Y2 and Y2<X2 are preferably satisfied, where the above dimension of each of the second inner conductors 42 in the longitudinal direction is Y2. As in the first preferred embodiment, the relationship X1<Y1<(L−E) is preferably satisfied.

Because Y1>Y2, contraction occurring in firing the first inner conductors 10 is greater than contraction occurring in firing the second inner conductors 42. Accordingly, although the second inner conductors 42 are provided, the residual stress in the ceramic element assembly portion at the second end surface 2b side is greater than the residual stress in the ceramic element assembly portion at the first end surface 2a side. Therefore, if a crack occurs, the crack runs from the edge of the second extended section 6b of the second external terminal electrode 6 arranged adjacent to the second end surface 2b toward the inside of the ceramic element assembly 2. Therefore, in the present preferred embodiment, as in the first preferred embodiment, because the relationships X1<Y1<(L−E) and Y2<X2 are preferably satisfied, if a crack occurs, the crack occurs at the second extended section 6b side with reliability and a short-circuit can be reliably prevented.

Figure 7:
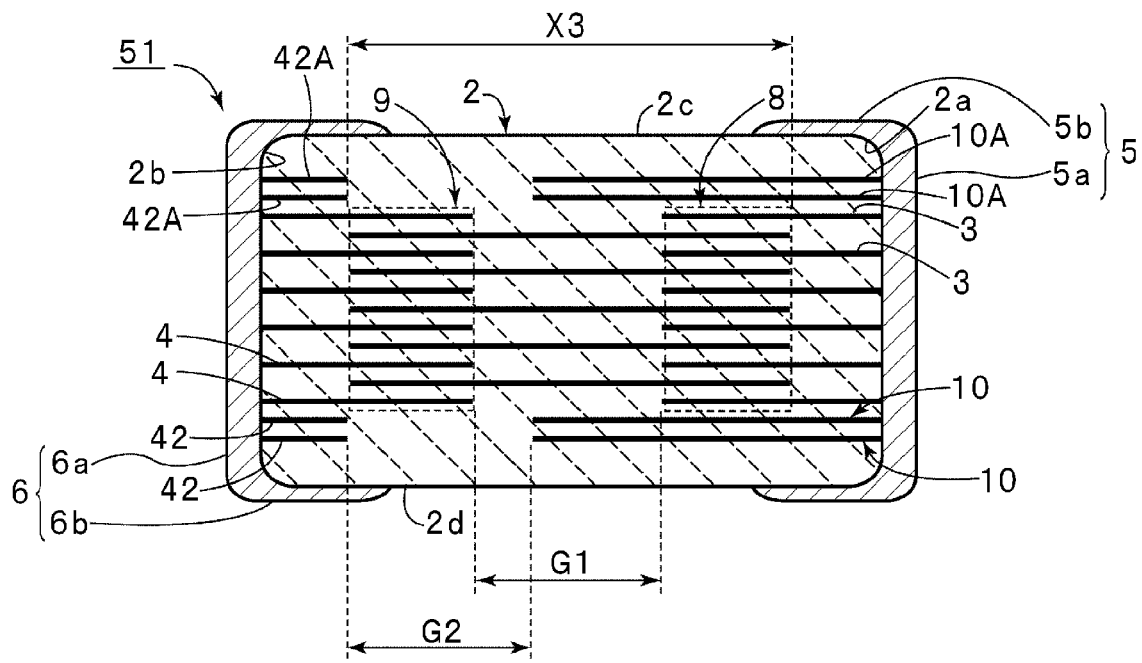
FIG. 7 is a front cross-sectional view of a multilayer ceramic capacitor according to a modification of the second preferred embodiment of the present invention.

FIG. 7 is a front cross-sectional view that illustrates a multilayer ceramic capacitor according to a modification of the multilayer ceramic capacitor in the second preferred embodiment. A multilayer ceramic capacitor 51 of the present modification includes the first inner conductors 10A and second inner conductors 42A, in addition to the first inner conductors 10 and the second inner conductors 42. The first inner conductors 10A are arranged above the first effective region 8, whereas the second inner conductors 42A are arranged above the second effective region 9 and adjacent to the second end surface 2b. In such a manner, the first and second inner conductors may be arranged not only below the effective regions 8 and 9 but also above the effective areas 8 and 9. With the present modification, the first principal surface 2c side and the second principal surface 2d side are arranged symmetrically or substantially symmetrically with respect to a center line passing through the center of the ceramic element assembly 2 and extend along the longitudinal direction, so the necessity to identify the orientation at both sides in the direction of layering is eliminated.

Figure 8:
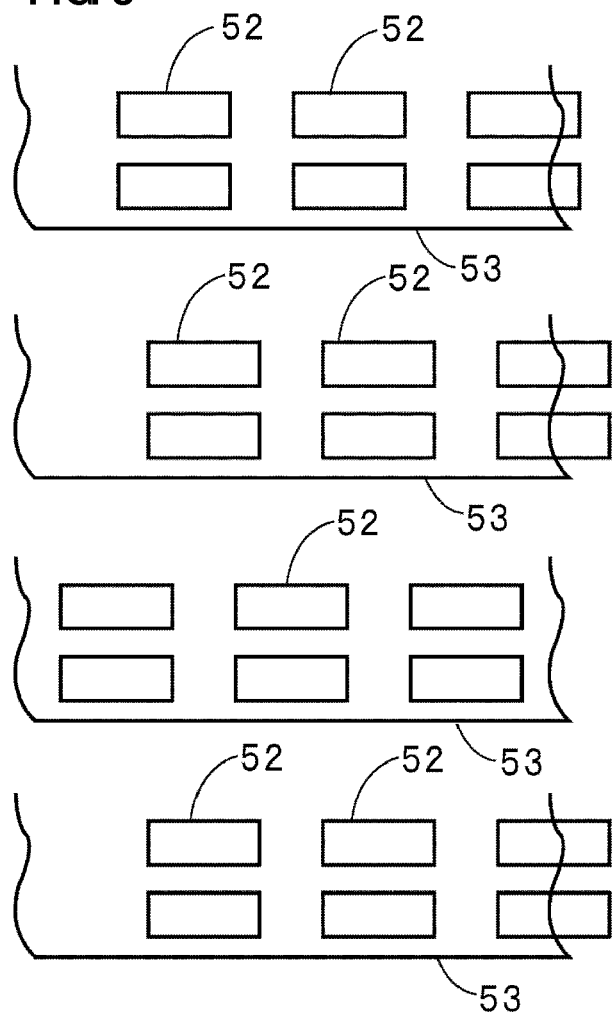
FIG. 8 is a schematic plan view for use in describing a process for preparing a ceramic multilayer structure to obtain the multilayer ceramic capacitor of the modification illustrated in FIG. 7.

Additionally, G1=G2=(L−X3) is preferably satisfied, where the distance between the first and second internal electrodes 3 and 4 is G1, the distance between the first inner conductor 10 or 10A and the second inner conductor 42 or 42A is G2, and the dimension of the floating internal electrode 7 along the longitudinal direction is X3. Accordingly, as illustrated in the schematic plan view in FIG. 8, the ceramic element assembly 2 for the multilayer ceramic capacitor 51 is obtainable by using a plurality of ceramic green sheets 53 each having single conductive patterns 52. That is, the plurality of ceramic green sheets 53 on which the plurality of rectangular conductive patterns 52 are printed at specific internals can be prepared, they can be layered so as to be displaced at specific intervals in the above longitudinal direction in the multilayer ceramic capacitor 51 to be finally obtained, a mother multilayer structure can be obtained, and the mother multilayer structure can be cut. In this manner, the ceramic multilayer structure for obtaining the ceramic element assembly 2 for the multilayer ceramic capacitor 51 is readily obtainable.

Figure 9:
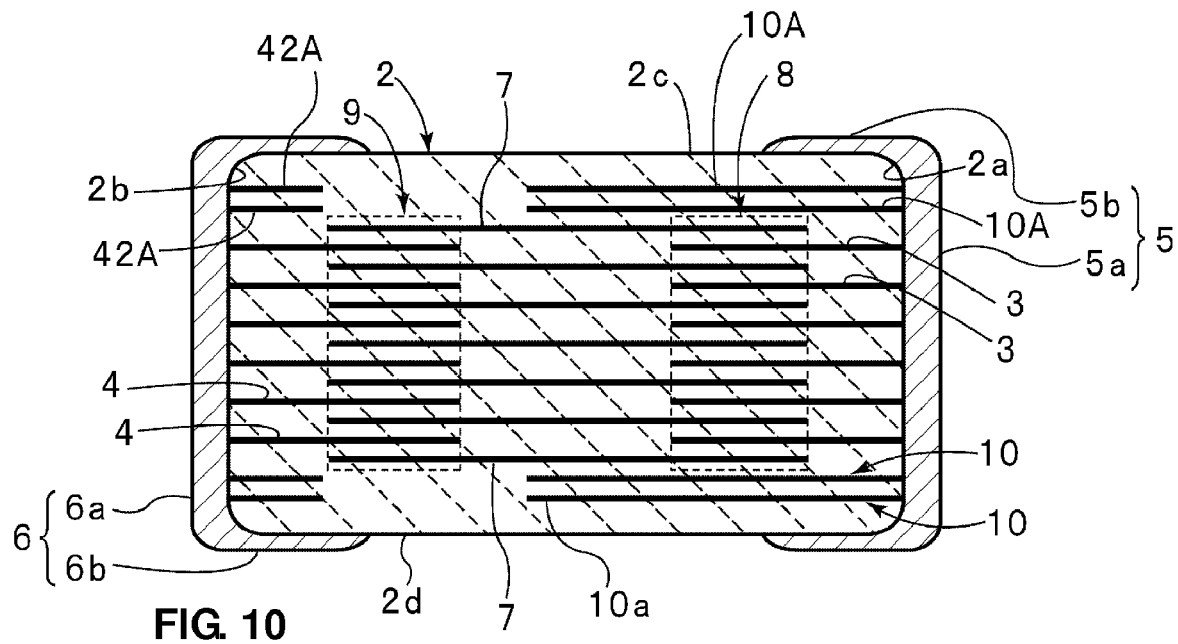
FIG. 9 is a front cross-sectional view for use in describing a multilayer ceramic capacitor of another modification of the second preferred embodiment of the present invention.
Figure 10:
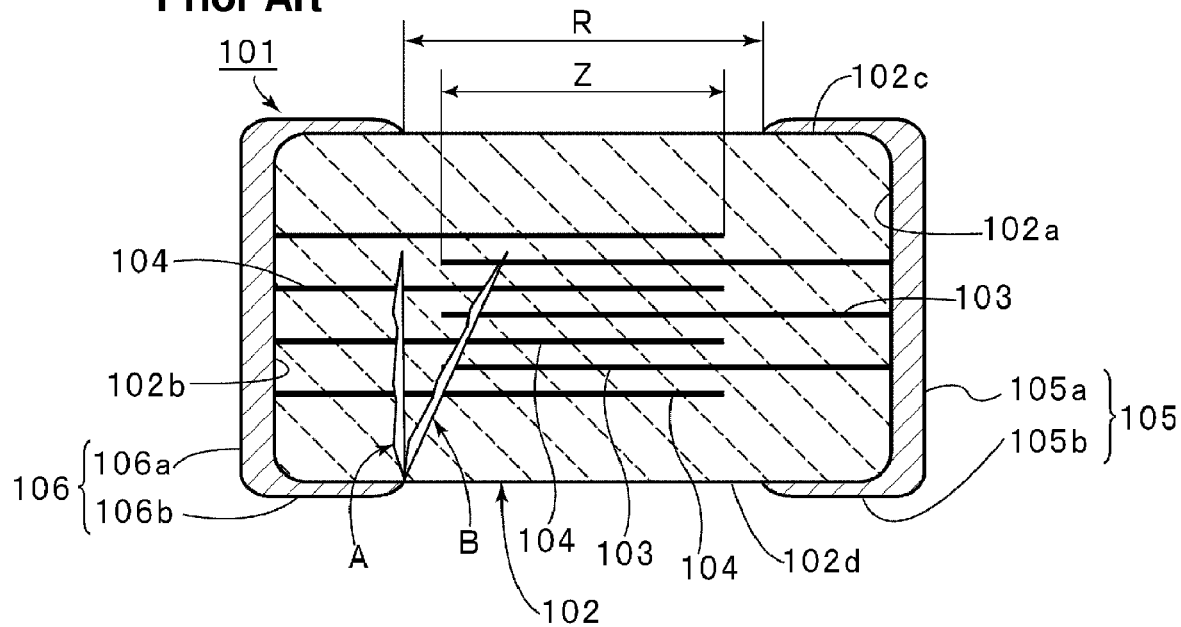
FIG. 10 is a front cross-sectional view that illustrates a traditional multilayer ceramic capacitor.
Figure 11:
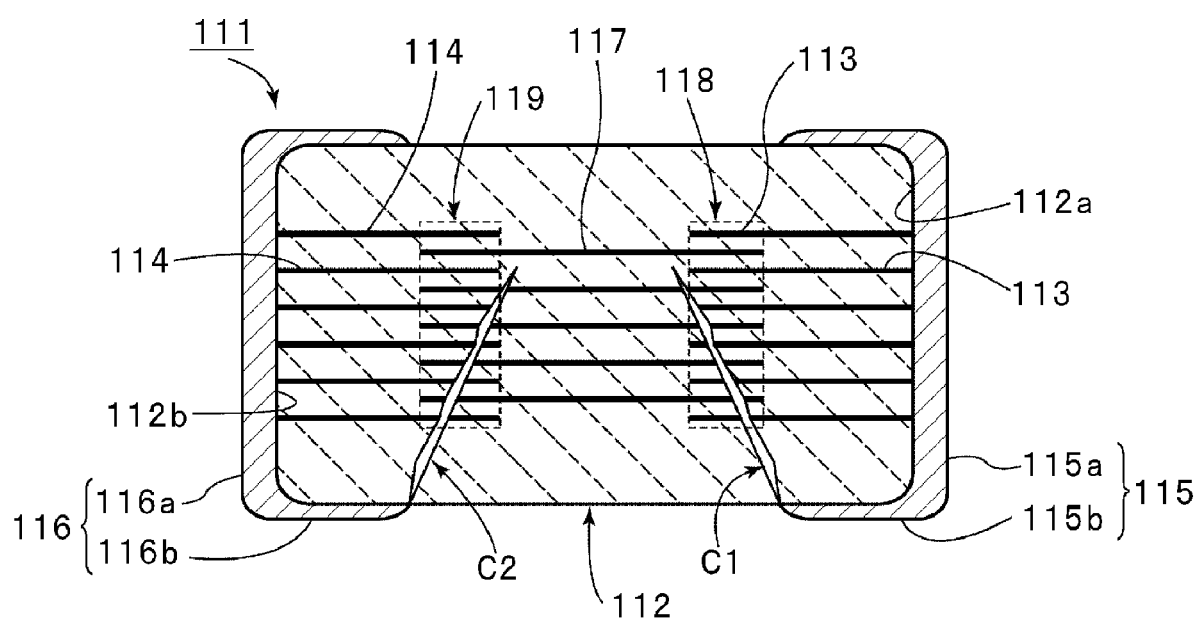
FIG. 11 is a front cross-sectional view that illustrates another example traditional multilayer ceramic capacitor.

FIG. 9 is a front cross-sectional view that illustrates another modification of the multilayer ceramic capacitor in the second preferred embodiment. For the present modification, as in the case of the modification illustrated in FIG. 7, the plurality of first inner conductors 10A and the plurality of second inner conductors 42A are disposed in the upper portion in the direction of layering. Additionally, the floating internal electrodes 7 are also disposed outermost in the direction of layering in the effective regions 8 and 9. This causes capacitance to occur between the floating internal electrode 7 and each of the first inner conductors 10 and 10A and between the floating internal electrode 7 and each of the second inner conductors 42 and 42A. Using that capacitance, the capacity can be adjusted during the design process.

With the multilayer ceramic capacitors according to the above-described first and second preferred embodiments and the modifications thereof, a crack at the edge of the first extended section of the first external terminal electrode occurs less frequently, a crack more likely occurs at the edge of the second extended section of the second external terminal electrode, and this enables a short-circuit to be reliably prevented in the first effective region. Such a structure is applicable to not only a multilayer ceramic capacitor but also a multilayer ceramic electronic component including various internal electrodes, such as a multilayer ceramic thermistor.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic electronic component comprising:
a ceramic element assembly including a plurality of layered ceramic layers, the ceramic element assembly including opposed first and second principal surfaces and opposed first and second end surfaces, a direction of layering thereof being a direction that extends from the first principal surface to the second principal surface;
a first external terminal electrode including a first terminal electrode main section provided on the first end surface and a first extended section continuous with the first terminal electrode main section and extending to the first and second principal surfaces;
a second external terminal electrode including a second terminal electrode main section provided on the second end surface and a second extended section continuous with the second terminal electrode main section and extending to the first principal surface and the second principal surface;
a first internal electrode disposed within the ceramic element assembly and extending to the first end surface so as to be electrically coupled to the first external terminal electrode;
a second internal electrode disposed within the ceramic element assembly, being substantially coplanar with the first internal electrode, and extending to the second end surface so as to be electrically coupled to the second external terminal electrode; and
a floating internal electrode disposed within the ceramic element assembly so as not to extend to either the first end surface or the second end surface, and opposed to the first internal electrode and the second internal electrode with one of the ceramic layers disposed therebetween; wherein
a portion in which the first internal electrode and the floating internal electrode are opposed to each other defines a first effective region, and a second effective region is defined in a portion in which the second internal electrode and the floating internal electrode are opposed to each other;
the multilayer ceramic electronic component further comprising:
a first inner conductor disposed within the ceramic element assembly and elongated in parallel or substantially in parallel with the first and second principal surfaces so as to overlap at least the first effective region in the direction of layering between the first effective region and at least one of the first and second principal surfaces; and
a relationship $X1<Y1<(L-E)$ is satisfied where L is a dimension of the ceramic element assembly in a longitudinal direction that extends from the first end surface to the second end surface, X1 is a length dimension of the first internal electrode along the longitudinal direction, Y1 is a distance between the first end surface and an end of the first inner conductor that is adjacent to the second end surface, and E is a distance from the second end surface to an end of the second extended section, and within the ceramic element assembly, the first inner conductor is not coplanar with any other inner conductors.

2. The multilayer ceramic electronic component according to claim 1, wherein a relationship $Y1 \geq L/2$ is satisfied.

3. The multilayer ceramic electronic component according to claim 1, wherein a relationship $Y1 \geq (L-X2)$ is satisfied where X2 is a length dimension of the second internal electrode along the longitudinal direction.

4. The multilayer ceramic electronic component according to claim 1, wherein relationships $F1<E0$ and $F2<E$ are satisfied where F1 is a distance between the first end surface and the first effective region, F2 is a distance between the second end surface and the second effective region, and E0 is a distance between the first end surface and an edge of the first extended section.

5. The multilayer ceramic electronic component according to claim 1, wherein, in the first and second effective regions, the floating internal electrode is located outermost in the direction of layering.

6. The multilayer ceramic electronic component according to claim 1, wherein, within the ceramic element assembly, the first inner conductor is arranged at one side in the direction of layering in the first effective region.

7. The multilayer ceramic electronic component according to claim 1, wherein the first inner conductor is arranged at each of both sides in the direction of layering in the first effective region.

8. A multilayer ceramic electronic component comprising:
a ceramic element assembly including a plurality of layered ceramic layers, the ceramic element assembly including opposed first and second principal surfaces and opposed first and second end surfaces, a direction of layering thereof being a direction extending from the first principal surface to the second principal surface;
a first external terminal electrode including a first terminal electrode main section provided on the first end surface and a first extended section continuous with the first terminal electrode main section and extending to the first and second principal surfaces;
a second external terminal electrode including a second terminal electrode main section provided on the second end surface and a second extended section continuous with the second terminal electrode main section and extending to the first principal surface and the second principal surface;

a first internal electrode disposed within the ceramic element assembly and extending to the first end surface so as to be electrically coupled to the first external terminal electrode;

a second internal electrode disposed within the ceramic element assembly, being substantially coplanar with the first internal electrode, and extending to the second end surface so as to be electrically coupled to the second external terminal electrode; and a floating internal electrode disposed within the ceramic element assembly so as not to extend to either the first end surface or the second end surface, and opposed to the first internal electrode and the second internal electrode with one of the ceramic layers disposed therebetween; wherein a portion in which the first internal electrode and the floating internal electrode are opposed to each other defines a first effective region, and a second effective region is defined in a portion in which the second internal electrode and the floating internal electrode are opposed to each other;

the multilayer ceramic electronic component further comprising:

a first inner conductor disposed within the ceramic element assembly and elongated in parallel or substantially in parallel with the first and second principal surfaces so as to overlap at least the first effective region in the direction of layering between the first effective region and at least one of the first and second principal surfaces; and a second inner conductor disposed within the ceramic element assembly and arranged to be substantially coplanar with the first inner conductor so as to be electrically isolated from the first inner conductor; and relationships $Y1>Y2$, $X1<Y1<(L-E)$, and $Y2<X2$ are satisfied where L is a dimension of the ceramic element assembly in a longitudinal direction that extends from the first end surface to the second end surface, X1 is a length dimension of the first internal electrode along the longitudinal direction, X2 is a length dimension of the second internal electrode along the longitudinal direction, Y1 is a distance between the first end surface and an end of the first inner conductor that is adjacent to the second end surface, Y2 is a distance between the second end surface and an end of the second inner conductor that is adjacent to the first end surface, and E is a distance from the second end surface to an end of the second extended section.

9. The multilayer ceramic electronic component according to claim 8, wherein a relationship $G1=G2=(L-X3)$ is satisfied where G1 is a distance between the first and second internal electrodes, G2 is a distance between the first and second inner conductors, and X3 is a length dimension of the floating internal electrode along the longitudinal direction.

10. The multilayer ceramic electronic component according claim 8, wherein a relationship $Y1 \geq L/2$ is satisfied.

11. The multilayer ceramic electronic component according to claim 8, wherein a relationship $Y1 \leq (L-X2)$ is satisfied where X2 is a length dimension of the second internal electrode along the longitudinal direction.

12. The multilayer ceramic electronic component according to claim 8, wherein relationships $F1<E0$ and $F2<E$ are satisfied where F1 is a distance between the first end surface and the first effective region, F2 is a distance between the second end surface and the second effective region, and E0 is a distance between the first end surface and an edge of the first extended section.

13. The multilayer ceramic electronic component according to claim 8, wherein, in the first and second effective regions, the floating internal electrode is located outermost in the direction of layering.

14. The multilayer ceramic electronic component according to claim 8, wherein, within the ceramic element assembly, the first inner conductor is arranged at one side in the direction of layering in the first effective region.

15. The multilayer ceramic electronic component according to claim 8, wherein the first inner conductor is arranged at each of both sides in the direction of layering in the first effective region.

* * * * *